United States Patent
Guerrero et al.

(10) Patent No.: US 8,051,809 B2
(45) Date of Patent: Nov. 8, 2011

(54) ENGINE COOLING SYSTEM FOR A VEHICLE

(75) Inventors: Pascal Guerrero, Rueil Malmaison (FR); Srun-Ngy Ap, Saint Remy les Chevreuse (FR); Philippe Jouanny, Guyancourt (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 0 days.

(21) Appl. No.: 12/720,212

(22) Filed: Mar. 9, 2010

(65) Prior Publication Data
US 2010/0155014 A1 Jun. 24, 2010

Related U.S. Application Data

(63) Continuation of application No. 10/549,887, filed as application No. PCT/FR2004/000636 on Mar. 16, 2004, now Pat. No. 7,699,028.

(30) Foreign Application Priority Data

Mar. 21, 2003 (FR) ..................................... 03 03495

(51) Int. Cl.
*F01P 1/06* (2006.01)
*F25D 17/02* (2006.01)
*B60H 1/00* (2006.01)

(52) U.S. Cl. ......................... 123/41.31; 165/41; 62/201

(58) Field of Classification Search ............... 123/41.01, 123/41.31, 41.33, 196 AB; 165/41, 100, 165/104.31; 62/201, 513
See application file for complete search history.

(56) References Cited

U.S. PATENT DOCUMENTS

| | | | |
|---|---|---|---|
| 2,188,172 | A | 1/1937 | Brehob |
| 4,061,187 | A | 12/1977 | Rajasekaran et al. |
| 4,535,729 | A | 8/1985 | Faylor |
| 4,620,509 | A | 11/1986 | Crofts |
| 5,526,873 | A | 6/1996 | Marsais et al. |
| 6,196,168 | B1 | 3/2001 | Eckerskorn et al. |
| 2003/0037913 | A1 | 2/2003 | Knecht et al. |

FOREIGN PATENT DOCUMENTS

| | | |
|---|---|---|
| EP | 0352158 A1 | 1/1990 |
| EP | 0909932 A2 | 4/1999 |
| GB | 2057564 A | 4/1981 |
| JP | 62-293086 A | 12/1987 |
| JP | 04-365616 A | 12/1992 |
| WO | 2004085810 A3 | 10/2004 |

OTHER PUBLICATIONS

International Search Report for International Application No. PCT/FR2004/000636, dated Dec. 7, 2004, 3 pages.
English language abstract for JP 62-293086 extracted from PAJ database, dated Aug. 5, 2009, 10 pages.
English language abstract for JP 04-365616 extracted from PAJ database, dated Aug. 5, 2009, 10 pages.

*Primary Examiner* — Noah Kamen
(74) *Attorney, Agent, or Firm* — Howard & Howard Attorneys PLLC

(57) ABSTRACT

The invention relates to a system which is used to cool at least one piece of motor vehicle equipment to a low temperature, comprising a heat transfer fluid circulation loop. According to the invention, a low-temperature heat exchanger (60) and at least one equipment exchanger (102) are mounted to the aforementioned circulation loop. The heat exchange surface of the equipment exchanger (102) is divided into at least first and second heat exchange sections (104,106). A first flow ($Q_1$) of heat-transfer fluid passes through the first heat exchange section (104), while a second smaller flow ($Q_2$) passes through the second section. The invention is suitable for motor vehicle heat exchangers.

14 Claims, 3 Drawing Sheets

ENGINE COOLING SYSTEM FOR A VEHICLE

RELATED APPLICATIONS

This application claims priority to and all the advantages of U.S. patent application No. 10/549,887 filed on Sep. 16, 2005, which claims priority to International Patent Application No. PCT/FR2004/000636 filed on Mar. 16, 2004, which claims priority to French Patent Application No. FR 03 03495, filed on Mar. 21, 2003.

BACKGROUND OF THE INVENTION

The invention relates to a system for cooling to a low temperature at least one piece of equipment, particularly a piece of motor vehicle equipment, comprising a circulation loop for heat-transfer fluid on which loop are mounted a low-temperature heat exchanger and at least an equipment exchanger comprising a heat-exchange surface. It also relates to a low-temperature heat exchanger and to an equipment exchanger that form part of the cooling system of the invention.

Present-day motor vehicles comprise an increasingly high number of pieces of equipment which exchange heat with their external surroundings. Some of these pieces of equipment need to be heated up, for example the fuel heater. However, most of these pieces of equipment need to be cooled. This is the case, in particular, of the condenser which forms part of the motor vehicle cabin air-conditioning circuit, and is also true of the oil cooling radiator and the intercooler radiator. Increasingly often, also, the exhaust gases are cooled in order to reduce pollution.

Some of these pieces of equipment, such as the oil cooling radiator or the radiator that cools the exhaust gases, do not need to be cooled to a low temperature. They can therefore be placed without disadvantage in the cooling circuit of the vehicle combustion engine through which circuit there circulates a heat-transfer fluid the temperature of which generally ranges between 85° C. and 100° C. However, other pieces of equipment need to operate at the lowest possible temperature so as to improve their efficiency. This is the case in particular of the condenser of the air-conditioning circuit and the intercooler.

This is why provision is made for currently known vehicles to be equipped with a low-temperature cooling circuit through which a heat-transfer fluid circulates at a temperature below that of the high-temperature circuit. The condenser of the air-conditioning circuit or the intercooler may thus be cooled more effectively down to a lower temperature.

However, in currently known vehicles, the low-temperature cooling circuit is equipped with a low-temperature heat exchanger which has just one inlet nozzle and just one outlet nozzle, the heat-transfer fluid circulating in one or several passes. The low-temperature heat exchanger delivers just one temperature level and the fluid that is to be cooled, for example the air in the intercooler, is cooled to just one level of heat exchange.

In currently known vehicles, the coolant fluid is condensed by the ambient air but it is possible, by using a low-temperature circuit, to condense it using the same heat-transfer fluid as is used to cool the engine.

The cooling of these fluids is therefore often insufficient to guarantee an optimum reduction in temperature. For example, the temperature of the charge air is too high on the intake side at critical points in the event of high load on the engine, or alternatively the condensation of the coolant fluid is insufficient, which results in degraded performance of the air-conditioning circuit.

BRIEF SUMMARY OF THE INVENTION

The object of the present invention is a system for cooling, to a low temperature, at least one piece of motor vehicle equipment which solves these disadvantages.

These objects are achieved, in accordance with the invention, through the fact that the heat-exchange surface of the equipment exchanger is split between at least a first and a second heat-exchange section, the first heat-exchange section having a first flow rate of heat-transfer fluid passing through it, the second heat-exchange section having a second flow rate of heat-transfer fluid passing through it, the first flow rate being greater than the second flow rate.

By virtue of this characteristic, the fluid that is to be cooled is cooled to at least two heat-exchange levels. Of course, it may just as easily be cooled to more than two heat-exchange levels.

The fluid involved in said first and second flow rates of fluid is the fluid from the low-temperature heat exchanger, the sum of said flow rates advantageously being equal to the flow rate entering said low-temperature heat exchanger.

This cooling system can advantageously be applied to a condenser of an air-conditioning circuit which comprises a stage for condensing and a stage for supercooling the coolant fluid.

The low-temperature heat exchanger might deliver just one temperature level. In this case, it has a single outlet nozzle. However, in a preferred embodiment, the low-temperature heat exchanger comprises at least a first and a second outlet nozzle for the heat-transfer fluid, the first nozzle being connected to the first heat-exchange section of the equipment exchanger, the second outlet nozzle for the heat-transfer fluid being connected to the second heat-exchange section of the equipment exchanger, the heat-transfer fluid leaving the low-temperature heat exchanger via the first nozzle being at a temperature higher than that of the fluid leaving the low-temperature heat exchanger via the second nozzle.

By virtue of this characteristic, the temperature of the heat-transfer fluid is lower in the second heat-exchange section of the equipment exchanger, thus allowing the fluid passing through this exchanger to be cooled to a greater extent.

In one particular embodiment, the low-temperature heat exchanger comprises a multitude of fluid circulation passes through which the heat-transfer fluid travels in succession, the first nozzle being located upstream of the second nozzle with respect to the circulation of the heat-transfer fluid through the successive passes.

In this way, the heat-transfer fluid tapped off by the first nozzle is at a higher temperature than the heat-transfer fluid tapped off by the second nozzle. Of course, it is possible to provide more than two outlet nozzles. It is possible, for example, to provide a third outlet nozzle situated downstream of the second nozzle so as to tap off fluid at an even lower temperature still.

Advantageously, the flow rates decrease. In other words, the flow rate tapped off by the first nozzle is higher than the flow rate tapped off by the second nozzle which is itself higher than the flow rate tapped off by the third nozzle, etc. It is possible, for example, to provide increasing pressure drops in order to achieve this result.

Additional or alternative characteristics of the invention are listed below:

the circulation loop comprises a circulation pump;

the circulation loop is mounted as a bypass between the inlet and outlet of the cooling circuit of the motor vehicle combustion engine;

the equipment exchanger is an intercooler;

the equipment exchanger is a condenser forming part of the motor vehicle cabin air-conditioning circuit;

the condenser comprises a coolant-fluid condensation section and a coolant-fluid supercooling section and a reservoir for filtering and dehydrating the coolant fluid, the condensation section constituting the first, heat-exchange section of the equipment exchanger and the supercooling section constituting the second heat-exchange section of the equipment exchanger;

the reservoir for filtering and dehydrating the coolant fluid may be inserted between the condensation section and the supercooling section or alternatively it may be situated after the supercooling section.

Other characteristics and advantages of the invention will become further apparent from reading the description which follows of exemplary embodiments given by way of illustration with reference to the attached figures. In these figures:

DETAILED DESCRIPTION OF THE INVENTION

Figure 1:
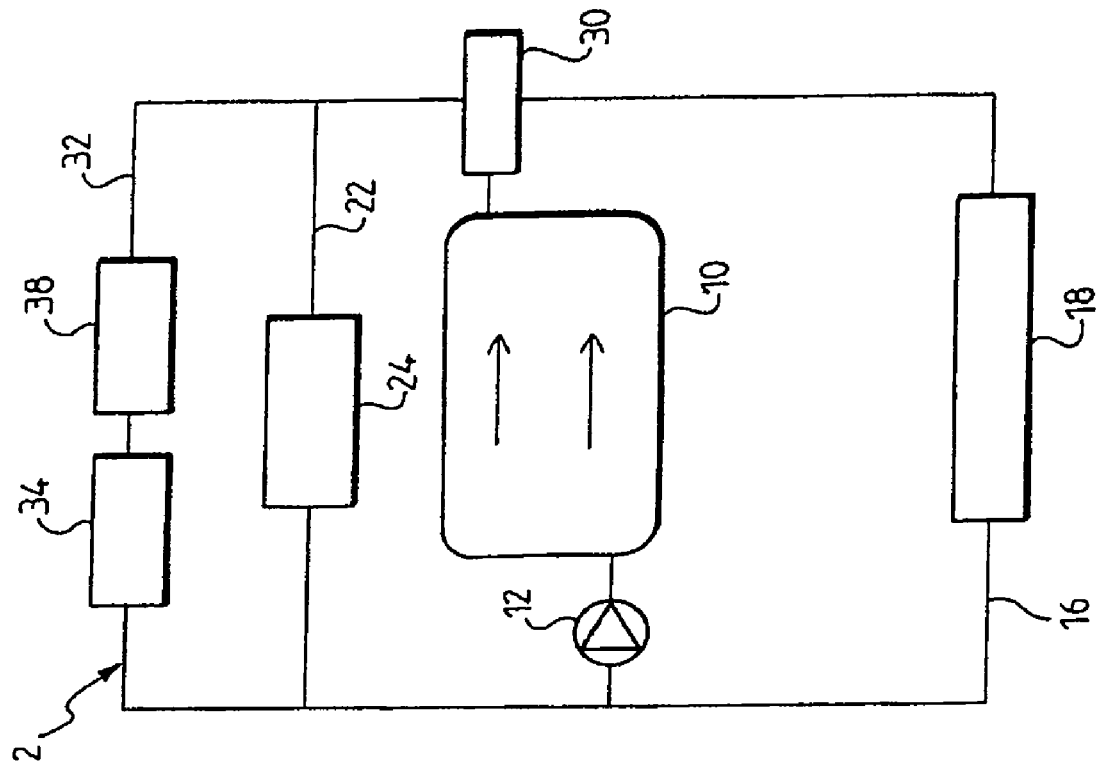
FIG. 1 illustrates the management of the thermal energy given off by a motor vehicle engine using a system comprising a high-temperature loop and a low-temperature loop.
Figure 1:
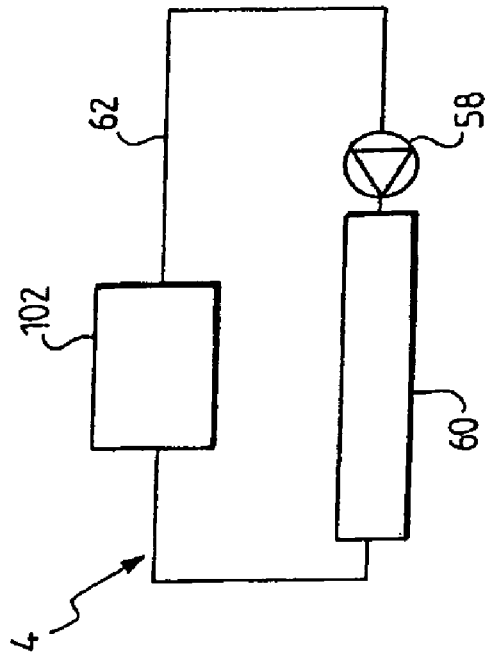

FIG. 1 is an overall view of a system for managing the thermal energy given off by an engine 10 of a motor vehicle, which comprises a high-temperature loop denoted by the general reference 2 and a low-temperature loop denoted by the general reference 4, the loops 2 and 4 being independent. The high-temperature loop 2 comprises the engine 10, a circulation pump 12 circulating the heat-transfer fluid through the circuit, a thermostat or thermostatic valve (not depicted) and a high-temperature radiator 18 which is the main radiator of the vehicle. The high-temperature loop also comprises a heating branch 22 on which there is mounted a unit heater 24 used for heating the cabin of the vehicle. Furthermore, pieces of equipment which do not need to be cooled to a very low temperature, for example an oil radiator 34 or an exhaust gas cooler 38, are mounted on a branch 32.

The low-temperature loop 4 comprises a circulation pump 58, a low-temperature heat exchanger 60 (in this instance a cooling radiator) and an equipment exchanger 102, for example a condenser of an air-conditioning circuit or an intercooler. The pump 58 and the exchangers 60 and 102 are mounted in series in a branch 62.

The flow rate of heat-transfer fluid circulating through the high-temperature loop 2 is about ten times as high as the flow rate circulating the low-temperature loop 4. By way of example, the flow rate circulating through the high-temperature radiator 18 may range from 5000 to 10,000 liters per hour, while the flow rate circulating through the low-temperature radiator 60 ranges between 0 and 1,000 liters/hour.

Figure 2:
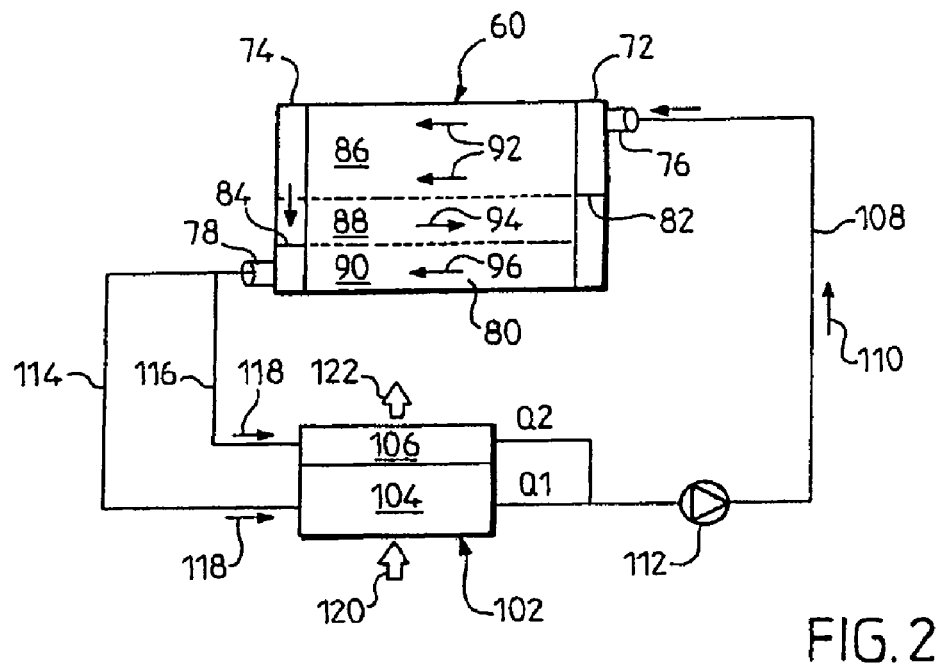
FIG. 2 depicts a first example of circulation in an independent low-temperature cooling system according to the invention.

FIG. 2 depicts a first embodiment of a low-temperature cooling system according to the invention. The low-temperature radiator 60 comprises an inlet header box 72 and an outlet header box 74. An inlet nozzle 76 is connected to the inlet header box 72 and an outlet nozzle 78 is connected to the outlet header box 74. A matrix of tubes 80, generally flat, is arranged between the inlet 72 and outlet 74 header boxes. The inlet header box 72 is split into two by a transverse partition 82 and, likewise, the outlet header box 74 is split into two by a transverse partition 84. Thus three passes 86, 88 and 90 for the circulation of the heat-transfer fluid are delimited.

Having entered the header box 72, the heat-transfer fluid first of all travels through the pass 86, as indicated schematically by the arrows 92, then the pass as indicated schematically by the arrow 94 and finally the pass 90 as indicated schematically by the arrow 96. The cooling system also comprises an equipment exchanger 102, for example an intercooler or a condenser of an air-conditioning circuit. The equipment exchanger 102 comprises an inlet header box and an outlet header box, each of these boxes being split into two by a transverse partition (not depicted). This then determines two heat exchange sections 104 and 106. These heat-exchange sections are defined by the number of tubes present in the two chambers delimited by the transverse partitions of the header boxes. As can be seen from FIG. 2, the heat-exchange section 104 is preferably larger than the heat-exchange section 106.

The fluid circulation loop comprises a branch 108 in which the heat-transfer fluid circulates in the direction defined by the arrow 110 under the impetus of a circulation pump 112, for example an electric pump. The fluid circulation loop also comprises two branches 114 and 116 in which the fluid circulates in the direction defined by the arrows 118.

As indicated schematically by the arrows 120 and 122, the fluid that is to be cooled, for example the air in the intercooler or the coolant fluid in the air-conditioning circuit travels first of all through the heat-exchange section 104 then through the heat-exchange section 106. Thus, the fluid that is to be cooled is cooled to two levels of heat exchange.

In consequence, the flow rate $Q_1$ of the heat-transfer fluid which circulates in the first heat-exchange section 104 is greater than the flow rate $Q_2$ which circulates in the second heat-exchange section 106.

Figure 3:
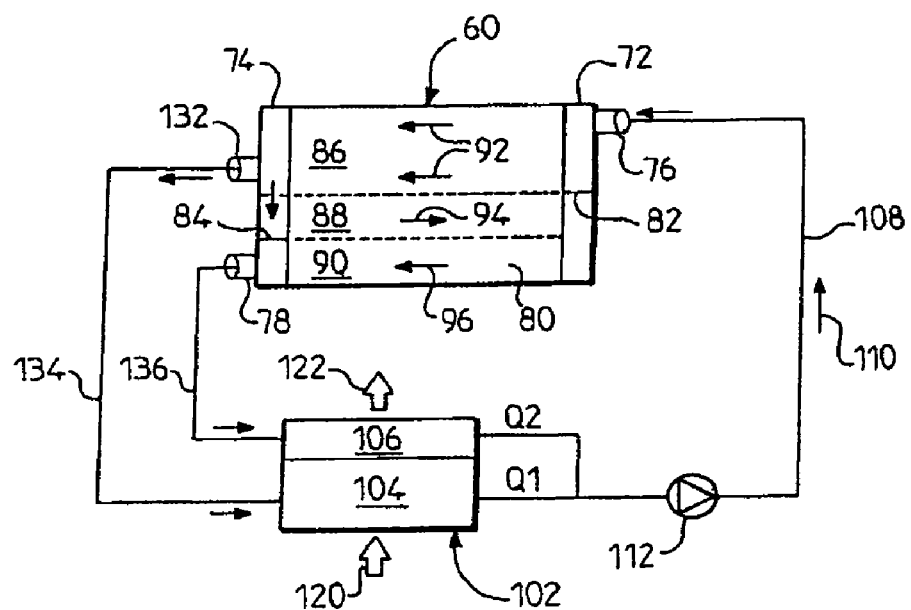
FIG. 3 depicts a second embodiment of an independent low-temperature cooling system according to the invention.

FIG. 3 depicts a second embodiment of a cooling system according to the invention. In this example, the low-temperature radiator 60 comprises two outlet nozzles, namely a nozzle 78, as before, and a second nozzle referenced 132. The nozzle 132 taps off heat-transfer fluid at the first fluid circulation pass (arrows 92) while the second nozzle 78 taps off fluid at the last fluid circulation pass (arrow 96). Thus, the heat-transfer fluid which has flowed through just one pass of the low-temperature exchanger 60 emerges via the outlet nozzle 132 at a temperature higher than that of the heat-transfer fluid which has traveled in succession through the three passes of the exchanger 60 and which emerges via the outlet 78.

In this example, the low-temperature cooling radiator 60 therefore delivers two temperature levels. The fluid of the first temperature level enters the heat-exchange section 104 via a pipe 134, while the fluid of the second temperature level (which is lower) enters the heat-exchange section 106 via a pipe 136. The distribution of the pressure drops in the circuit, particularly in the outlet nozzles 78 and 132 is such that the flow rate $Q_1$ that passes through the heat-exchange section 104 is higher than the flow rate $Q_2$ passing through the heat-exchange section 106.

A system of this type may make it possible to bring the fluid that is to be cooled down to a temperature significantly lower than can be achieved in a system delivering just one temperature level. By way of example, the heat-transfer fluid emerges from the first pass at a temperature ranging between 40° C. and 60° C. After the second pass 94, its temperature ranges between 30° C. and 50° C., and finally, after the third pass 90, its temperature drops to about 20° C. to 40° C. The heat-transfer fluid entering the heat-exchange section 104 therefore has an average temperature of about 50° C., whereas the fluid entering the heat-exchange section 106 has a temperature of about 30° C. These values are given by way of indication and are dependent on ambient temperature.

The fluid that is to be cooled gives up most of its heat in the first heat-exchange section 104 before being placed in a heat-exchange relationship with a heat-transfer fluid at the far lower temperature which allows its outlet temperature to be lowered. This cooling system can advantageously be applied to a condenser of an air-conditioning circuit because it makes it possible, in the first heat-exchange section 104, to condense the coolant fluid and supercool this fluid in the heat-exchange section 106.

Figure 4:
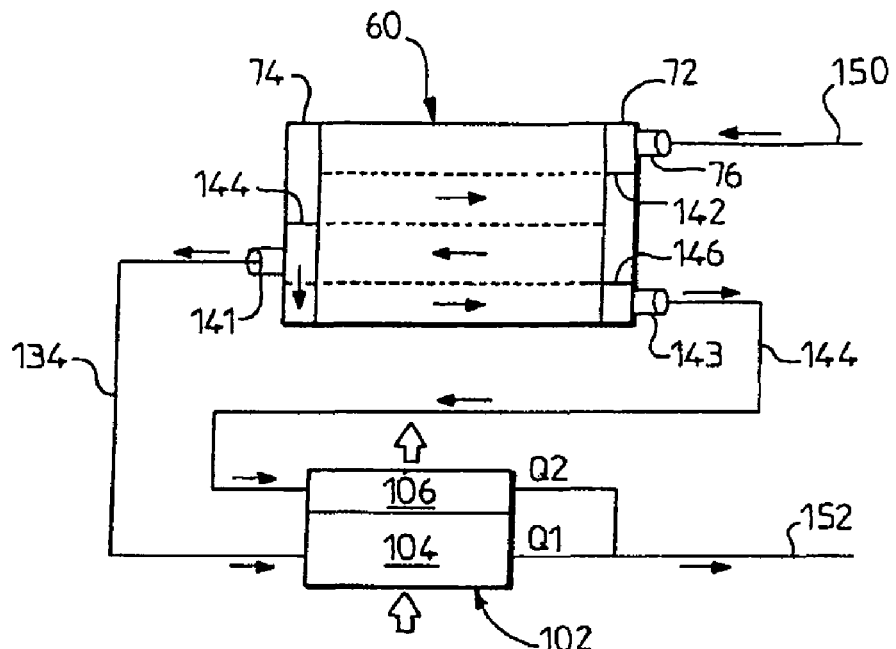
FIG. 4 depicts a cooling system according to the invention mounted as a bypass at the terminals of the high-temperature circuit of the combustion engine.

FIG. 4 depicts another embodiment of a cooling system according to the invention. In this system, the low-temperature cooling radiator 60 has four passes. Specifically, the inlet header box 72 has two transverse dividing partitions 142 and 146 while the outlet header box 74 has just one dividing partition 144. The dividing partitions 142, 144 and 146 therefore determine four outbound and return paths for the heat-transfer fluid in the tubes of the low-temperature heat exchanger 60.

An outlet nozzle 141 taps off the fluid after it has passed through the third pass. This fluid is carried, as in the previous example, to the heat-exchange section 104 by the pipe 134 of the equipment exchanger 102. An outlet nozzle 143 taps off the heat-transfer fluid after it has passed through the fourth and final pass of the low-temperature heat exchanger 60. This fluid is carried by the pipe 144 to the heat-exchange section 106 of the equipment exchanger 102. Thus, as before, the fluid that passes through the heat-exchange section 106 is at a temperature lower than that of the fluid that passes through the heat-exchange section 104.

Furthermore, unlike in the previous examples, the fluid circulation loop is not independent but is mounted as a bypass across the terminals of the high-temperature circuit 2. A pipe 150 may tap off the fluid directly at the outlet from the engine. A pipe 152 is connected to the inlet of the vehicle engine.

Thus, in this embodiment, the temperature of the fluid is higher than in the previous cases. The heat-transfer fluid enters the inlet header box at a temperature of about 90° C. It emerges via the outlet nozzle 141 at a temperature of about 60° C. and via the outlet nozzle 143 at a temperature of about 40° C. It can thus be seen that, in spite of a high inlet temperature, the heat-transfer fluid can be cooled down to a relatively low temperature.

Figure 5:
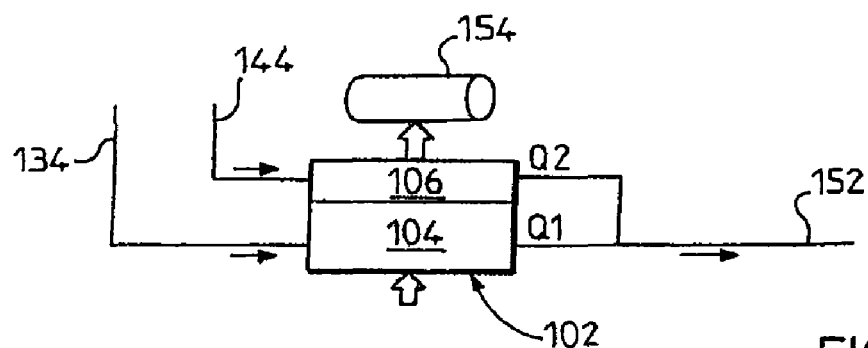
FIGS. 5 and 6 are partial views of the cooling system of the invention adapted to the cooling of an air-conditioning condenser.
Figure 6:
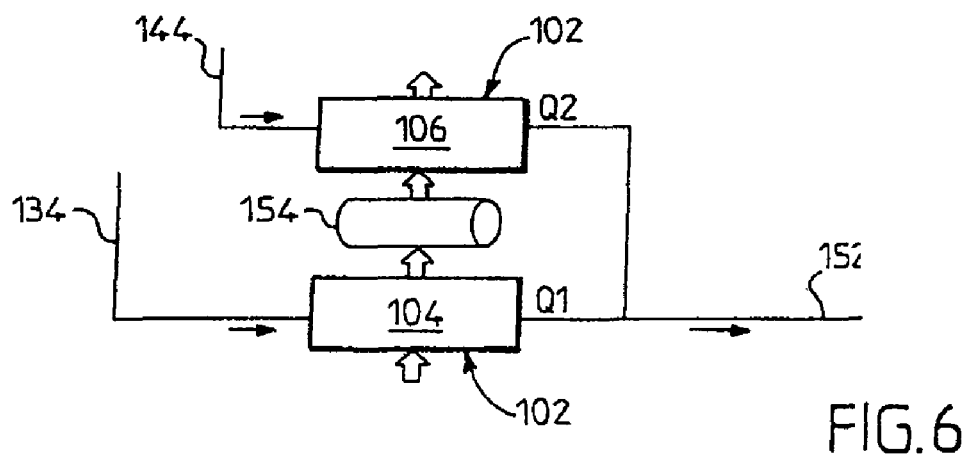

The cooling system of the invention can advantageously be applied to the cooling of the coolant fluid of an air-conditioning circuit as depicted in FIGS. 5 and 6. Indeed it is known that the condensers of air-conditioning circuits comprise an intermediate reservoir known as a "bottle" that allows the coolant fluid to be filtered and dehydrated. This intermediate reservoir also allows variations in volume of this fluid to be compensated for and allows the liquid and gaseous phases to separate. Its insertion between an upstream part and a downstream part of the condenser means that only fluid in the liquid state, which is thus supercooled below the liquid/gas equilibrium temperature can be made to circulate through this part of the condenser, thus improving condenser performance and making the performance relatively independent of the amount of fluid contained in the circuit.

The intermediate reservoir is generally fixed to a base secured to one of the header boxes of the condenser and through which two connecting pipes pass. This reservoir is equipped at its lower end with a head fixed to the base by means of a screw thread.

This situation corresponds to the embodiment depicted in FIG. 6 in which the intermediate reservoir 154 is inserted between the heat-exchange sections 104 and 106. The heat-exchange section 104 thus condenses the coolant fluid while the heat-exchange section 106 supercools it.

In an alternative form of embodiment depicted in FIG. 5, the reservoir may be arranged at the outlet of the supercooling stage. However, the condenser in the same way comprises a condensation section 104 and a supercooling section 106.

The invention claimed is:

1. A system for cooling to a low temperature at least one piece of equipment, the system comprising a circulation loop (4) for heat-transfer fluid on which loop are mounted a low-temperature heat exchanger (60) and at least an equipment exchanger (102) comprising a heat-exchange surface, the heat-exchange surface of the equipment exchanger (102) being split between at least a first and a second heat-exchange section (104, 106), the first heat-exchange section (102) having a first flow rate (Q1) of heat-transfer fluid passing through it, the second heat-exchange section (106) having a second flow rate (Q2) of heat-transfer fluid passing through it, the first flow rate (Q1) being greater than the second flow rate (Q2), wherein the low-temperature circulation loop (4) is mounted as a bypass between an inlet and an outlet of a cooling circuit (2) of a motor vehicle combustion engine.

2. The cooling system as claimed in claim 1 wherein the low-temperature circulation loop (4) comprises a circulation pump (58).

3. The cooling system as claimed in claim 1 wherein the equipment exchanger (102) is an intercooler.

4. The cooling system as claimed in claim 1 wherein the equipment exchanger (102) is a condenser forming part of a motor vehicle cabin air-conditioning circuit.

5. The cooling system as claimed in claim 4 wherein the condenser comprises a fluid condensation section (104) and a fluid supercooling section (106) and a reservoir (154) for filtering and dehydrating the fluid, the condensation section constituting the first heat-exchange section (104) of the equipment exchanger, the supercooling section constituting the second heat-exchange section (106) of the equipment exchanger.

6. The cooling system as claimed in claim 5 wherein the reservoir (154) is inserted between the first heat-exchange section (104) and the second heat-exchange section (106).

7. The cooling system as claimed in claim 5 wherein the reservoir (154) is situated after the second heat-exchange section (106).

8. A system for cooling to a low temperature at least one piece of equipment, the system comprising a circulation loop (4) for heat-transfer fluid on which loop are mounted a low-temperature heat exchanger (60) and at least an equipment exchanger (102) comprising a heat-exchange surface, the heat-exchange surface of the equipment exchanger (102) being split between at least a first and a second heat-exchange section (104, 106), the first heat-exchange section (102) having a first flow rate (Q1) of heat-transfer fluid passing through it, the second heat-exchange section (106) having a second flow rate (Q2) of heat-transfer fluid passing through it, the first flow rate (Q1) being greater than the second flow rate (Q2) wherein the low-temperature heat exchanger (60) comprises an outlet nozzle (78) for the heat-transfer fluid, the outlet nozzle (78) being connected to the first heat exchange section (104) and to the second heat-exchange section (106).

9. The cooling system as claimed in claim 8 including a first branch (114) in fluid communication with the outlet nozzle (78) and the first heat-exchange section (104) and a second branch (114) in fluid communication with the outlet nozzle (78) and the second heat-exchange section (106).

10. The cooling system as claimed in claim 8 wherein the first heat-exchange section (104) is larger than the second heat-exchange section (106).

11. A system for cooling to a low temperature at least one piece of equipment, the system comprising a circulation loop (4) for heat-transfer fluid on which loop are mounted a low-temperature heat exchanger (60) and at least an equipment exchanger (102) comprising a heat-exchange surface, the heat-exchange surface of the equipment exchanger (102) being split between at least a first and a second heat-exchange section (104, 106), the first heat-exchange section (102) having a first flow rate (Q1) of heat-transfer fluid passing through it, the second heat-exchange section (106) having a second flow rate (Q2) of heat-transfer fluid passing through it, the first flow rate (Q1) being greater than the second flow rate (Q2) wherein the equipment exchanger (102) includes an inlet header box and an outlet header box with the inlet header box and the outlet header box being split into two by a transverse partition that separates the first heat-exchange section (104) from the second heat-exchange section (106).

12. The cooling system as claimed in claim 11 wherein the first heat-exchange section (104) and the second heat exchange section (106) each include tubes extending from the inlet header box to the outlet header box with the first heat-exchange section (104) having more tubes than the second heat-exchange section (106).

13. The cooling system as claimed in claim 11 wherein the inlet header box of the equipment exchanger (102) includes an inlet for the first heat-exchange section and an inlet for the second heat-exchange section and wherein the outlet header box of the equipment exchanger (102) includes an outlet for the first heat-exchange section and an outlet for the second heat-exchange section.

14. The cooling system as claimed in claim 13 wherein the low-temperature heat exchanger (60) comprises an outlet nozzle (78) for the heat-transfer fluid, the outlet nozzle (78) being connected to the inlet for the first heat-exchange section and to the inlet for the second-heat exchange section.

* * * * *